(12) United States Patent
Amrilloev et al.

(10) Patent No.: US 10,671,720 B2
(45) Date of Patent: *Jun. 2, 2020

(54) SYSTEM AND METHOD OF DETECTING UNWANTED SOFTWARE

(71) Applicant: AO Kaspersky Lab, Moscow (RU)

(72) Inventors: Alexander V. Amrilloev, Moscow (RU); Alexander A. Stroykov, Moscow (RU); Alexey S. Subbotin, Moscow (RU); Pavel V. Korzh, Moscow (RU); Mikhail A. Modin, Moscow (RU)

(73) Assignee: AO Kaspersky Lab, Moscow (RU)

( * ) Notice: Subject to any disclaimer, the term of this patent is extended or adjusted under 35 U.S.C. 154(b) by 0 days.

This patent is subject to a terminal disclaimer.

(21) Appl. No.: 16/271,944

(22) Filed: Feb. 11, 2019

(65) Prior Publication Data

US 2019/0171810 A1 Jun. 6, 2019

Related U.S. Application Data

(63) Continuation of application No. 15/213,826, filed on Jul. 19, 2016, now Pat. No. 10,255,431.

(30) Foreign Application Priority Data

May 20, 2016 (RU) .................................. 2016119520

(51) Int. Cl.
*H04L 29/06* (2006.01)
*G06F 21/51* (2013.01)
(Continued)

(52) U.S. Cl.
CPC .............. *G06F 21/51* (2013.01); *G06F 17/16* (2013.01); *G06F 21/56* (2013.01); *H04L 67/10* (2013.01); *G06F 2221/033* (2013.01)

(58) Field of Classification Search
CPC ....................................................... G06F 21/51
See application file for complete search history.

(56) References Cited

U.S. PATENT DOCUMENTS 7,203,343 B2 *  4/2007  Manasse ............ G06K 9/00885
                                                    382/115
7,840,958 B1 * 11/2010  Wan ...................... G06F 21/554
                                                    717/174

(Continued)

OTHER PUBLICATIONS

Gatekeeper: Monitoring Auto-Start Extensibility Points (ASEPs) for Spyware Management; Wang et al., 2004 LISA XVIII—Nov. 14-19, 2004 pp. 33-46.

(Continued)

*Primary Examiner* — Harris C Wang
(74) *Attorney, Agent, or Firm* — Arent Fox LLP; Michael Fainberg

(57) ABSTRACT

Aspects of the present disclosure include systems and methods for detecting unwanted software. An exemplary method comprises identifying a first file associated with a first application and a second file installed on the computing device, wherein the first file is related to the second file, identifying a second application installed on the computing device that uses at least one of the first and second files, determining a first frequency of use for the first application and a second frequency of use for the second application, determining that the second application was installed at substantially the same time as the first application based on a comparison of the first frequency of use and the second frequency of use and determining that the first application is an unwanted application when the comparison of the first frequency and the second frequency results in a degree of similarity greater than a threshold value.

20 Claims, 4 Drawing Sheets

(51) Int. Cl.
  *G06F 21/56* (2013.01)
  *G06F 17/16* (2006.01)
  *H04L 29/08* (2006.01)

(56) References Cited

U.S. PATENT DOCUMENTS

| | | | | |
|---|---|---|---|---|
| 8,181,247 | B1* | 5/2012 | Pavlyushchik | G06F 21/552 726/22 |
| 8,250,569 | B1* | 8/2012 | Badenell | G06F 21/51 717/174 |
| 8,321,910 | B1* | 11/2012 | English | G06F 21/568 726/2 |
| 8,413,244 | B1* | 4/2013 | Nachenberg | H04L 63/145 713/188 |
| 8,667,586 | B2* | 3/2014 | Boney | G06F 21/56 702/190 |
| 8,701,192 | B1* | 4/2014 | Glick | G06F 21/566 726/24 |
| 8,775,333 | B1* | 7/2014 | Zahn | G06F 21/552 706/12 |
| 8,781,985 | B2* | 7/2014 | Subramanya | G06F 9/485 706/46 |
| 9,390,266 | B1* | 7/2016 | Zakorzhevsky | G06F 21/561 |
| 9,471,624 | B1* | 10/2016 | Patil | G06F 8/62 |
| 9,483,643 | B1* | 11/2016 | Yun | G06F 21/566 |
| 9,619,649 | B1* | 4/2017 | Yun | G06F 21/53 |
| 9,773,112 | B1* | 9/2017 | Rathor | G06F 21/56 |
| 2004/0260956 | A1* | 12/2004 | Pagan | G06F 9/4406 713/300 |
| 2005/0091192 | A1* | 4/2005 | Probert | G06F 8/62 |
| 2005/0155031 | A1* | 7/2005 | Wang | G06F 8/65 717/170 |
| 2005/0268112 | A1* | 12/2005 | Wang | G06F 21/51 713/188 |
| 2006/0212940 | A1* | 9/2006 | Wilson | G06F 21/56 726/22 |
| 2007/0079377 | A1* | 4/2007 | Pagan | G06F 21/562 726/24 |
| 2007/0294767 | A1* | 12/2007 | Piccard | G06F 21/568 726/24 |
| 2008/0028466 | A1* | 1/2008 | Burtscher | G06F 21/564 726/23 |
| 2010/0057905 | A1* | 3/2010 | Enscoe | G06F 11/302 709/224 |
| 2012/0110667 | A1* | 5/2012 | Zubrilin | G06F 21/56 726/24 |
| 2017/0337371 | A1* | 11/2017 | Amrilloev | G06F 21/56 |
| 2018/0007437 | A1* | 1/2018 | Jin | H04N 21/4583 |

OTHER PUBLICATIONS

Classification of Potentially Unwanted Programs Using Supervised Learning, Shahzad, Blekinge Institute of Technology; School of Computing, pp. 1-170.

\* cited by examiner

SYSTEM AND METHOD OF DETECTING UNWANTED SOFTWARE

CROSS-REFERENCE TO RELATED APPLICATIONS

The present application is a continuation of U.S. application Ser. No. 15/213,826, filed Jul. 19, 2016, which claims benefit of priority under 35 U.S.C. 119(a)-(d) to Russian Application No. 2016119520 filed on May 20, 2016, which is incorporated by reference herein.

FIELD OF TECHNOLOGY

The present application relates generally to antivirus technologies, and, more specifically, to systems and methods of detecting unwanted software on a computing device.

BACKGROUND

Due to the increase in computing power of modern computers, the complexity of software (a computer program or simply a program) used on computers has also increased significantly. Most often, modern software contains not only the executable file of the main program, but also a large number of files of auxiliary utilities, data libraries, and resources (such as icons, multimedia data), and so forth.

For proper installation of modern software on users' computers, special installation programs may be used, which provide the fine tuning of the software being installed, the adjustment of its interworking with other programs and underlying operating system, and installation of additional utilities.

Oftentimes in the course of installing the programs needed by the user, additional programs often not needed by the user are also installed on the user's computer (such as an antivirus, even though one has already been installed on the user's computer, or for example a browser supplement tracking the status of email services which the user has never used, and so forth).

Besides useful but unneeded programs, some installer programs may install so-called "unwanted software", as well as software presenting a potential (riskware) or actual (malware) danger.

It should be noted that, due to the development of computer networks in general and the Internet in particular, certain programs are downloaded from a computer network immediately prior to installation or an individual installer is formulated for each user at the server end. Such installers may include programs that the user has selected on a site distributing computer applications, which once again leads to the above-described problems—many programs not needed by the user are installed on the user's computer, among which there may be potentially dangerous or even harmful ones.

The difficulty of detecting the installation of unwanted software lies in the fact that many installer programs install the above-described programs with the consent of the user. The user is often unaware what he is installing and for what purpose. For example, certain installer programs may present the user with written terms of installation of additional programs such that he often selects an option involving an installation without real need to install them.

In detecting unwanted software, standard methods of dealing with malicious programs may be used, namely, detection with, e.g., the use of signature or heuristic methods and then removal of the unwanted software.

The known technologies for detection are used to detect malicious software, as well as software presenting a potential threat, but are often unable to detect unwanted software installed on a user's computer.

The present invention solves the problem of detecting unwanted software.

SUMMARY

The invention is directed to, among other features, antivirus scanning of applications and detecting unwanted software on a user's computer or computing device.

The technical result of the present invention comprises detecting unwanted applications in a computer system via the disclosed system and method.

In one exemplary aspect, a computer system for detecting an unwanted application on a computing device, comprising: a collecting module configured to: obtain an application which has been installed in the computer system; detect at least one file making up the obtained application; gather information on the relations of the detected file with at least one other file residing in the same computer system as the detected file, wherein two files are related if at least two of the conditions are fulfilled: the files were created by the same application, the files were loaded onto the computer from the same network address; the interval of time between modifications of the files is less than an established threshold value; the files have similar or identical attributes; send the gathered information to a search module; the search module configured to: detect at least one application containing at least one found file, said application being installed in the same computer system as the application obtained by the collecting module; send the information identifying the found application to a scanning module; the scanning module configured to: determine the frequencies of use of the obtained application and the application identified from the obtained information, where the frequency of use of the application characterizes the number of actions performed by the application in the computer system; detect the obtained application as being an unwanted application on the basis of a comparison of the frequencies of use of the obtained application and the application identified from the obtained information.

In another exemplary aspect, the threshold value of the interval of time between modifications of the files is at least: under 1 second; from 1 second to 1 minute; from 1 minute to 10 minutes.

In yet another exemplary aspect, the interval of time between the installation in the computer system of a file making up the application being scanned and a file related to it is less than an established threshold value, where the established threshold value is at least: under 1 second; from 1 second to 1 minute; from 1 minute to 10 minutes.

In another exemplary aspect, the application creating the files on the computer is the installer program.

In yet another exemplary aspect, the frequency of use of the application is at least: the frequency of running the application from the moment of its installation in the computer system and up to the moment of obtaining the application; the frequency of calling API functions of the operating system by the application during its running on the computer system; the frequency of modification of the files making up the application from the moment of their creation in the computer system to the moment of obtaining the application; the frequency of actions being performed with the use of interface elements of the application, for transmittal of data to said application.

In another exemplary aspect, a computer-implemented method of detecting one or more unwanted applications installed on a computing device comprises: obtaining, via a processor of the computing device, information relating to a first application installed on the computing device; detecting a first file associated with the first application; identifying a second file installed on the computing device and related to the first file based at least upon selected conditions; identifying a second application installed on the computing device using at least one of the first and second files; determining a frequency of use for each of the first and second applications; and determining whether the first application is an unwanted application based on the frequency of use for each of the first and second applications.

In another exemplary aspect, a system for detecting one or more unwanted applications installed on a computing device comprises: at least one processor configured to: obtain information relating to a first application installed on the computing device; detect a first file associated with the first application; identify a second file being related to the first file based at least upon selected conditions; identify a second application installed on the computing device using at least one of the first and second files; determine a frequency of use for each of the first and second applications; and determine whether the first application is an unwanted application based on the frequency of use for each of the first and second applications.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

The accompanying drawings, which are incorporated into and constitute a part of this specification, illustrate one or more example aspects of the present disclosure and, together with the detailed description, serve to explain their principles and implementations.

DETAILED DESCRIPTION

Example aspects of the invention are described herein in the context of a system, method and computer program product for detecting unwanted software on a computing device. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

A number of definitions and concepts are introduced as follows for describing various aspects of the invention.

An unwanted application may refer to an application installed on a computer or computing device without "conscious" participation of the user, not performing obviously malicious actions, yet able to cause inconvenience to the user in the process of its running (by the intrusive demonstration of advertising materials, changing user settings of underlying operating system and applications of the computer or computing device, for example, changing the start page of browsers, and so forth). "Conscious" participation of the user in the performing of the actions in the computer system may include an understanding of the nature of the actions being performed and the consequences which these actions may entail.

An unwanted file may include a file making up an unwanted application.

A legitimate application may include an application which is not unwanted at the moment of performing an antivirus scan.

A legitimate file may include a file making up a legitimate application.

Figure 1:
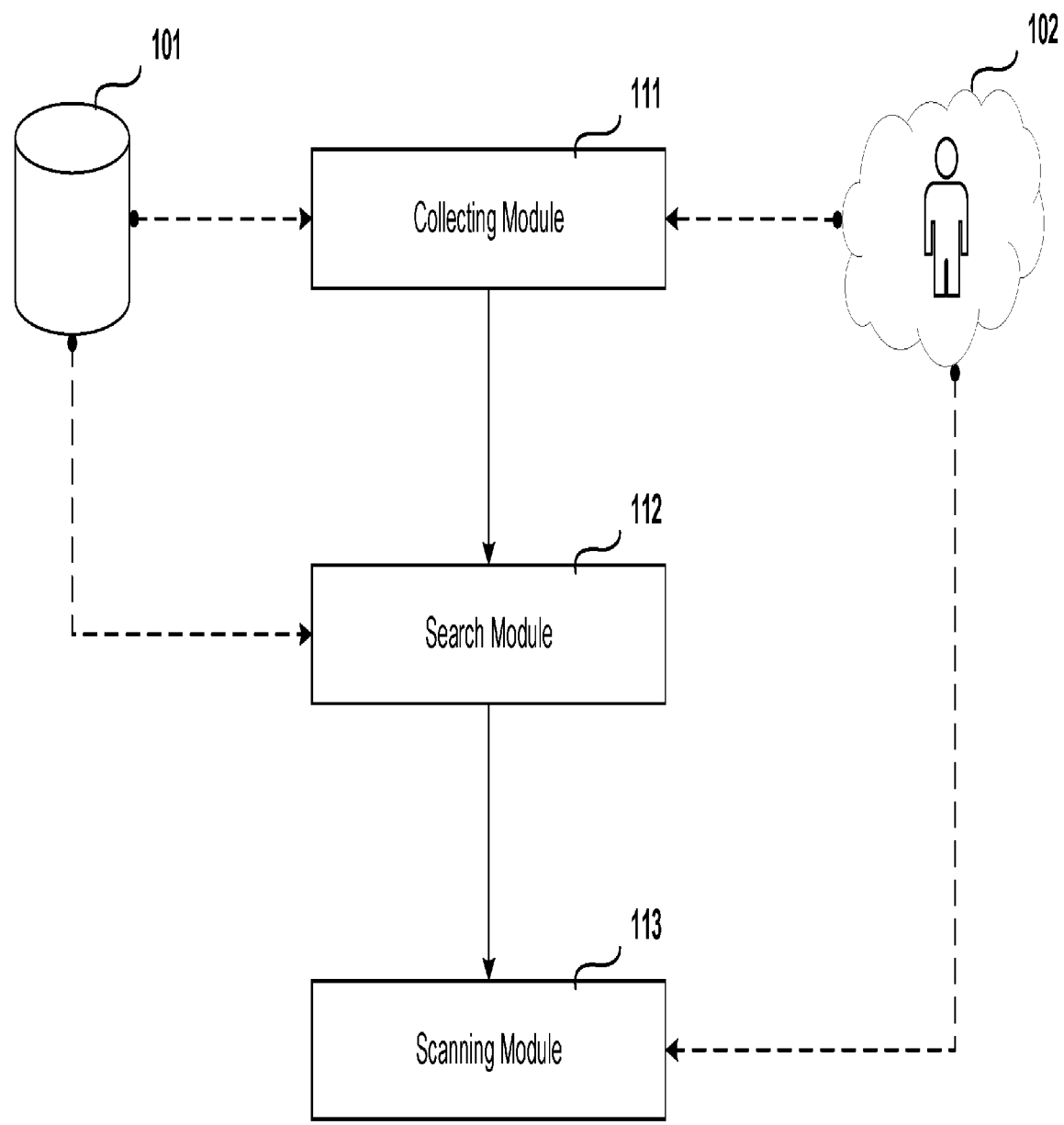
FIG. 1 illustrates a structural diagram of an example system for detecting unwanted software on a computing device according to aspects of the invention.

FIG. 1 illustrates an example of a structural diagram of a system for detecting unwanted software on a computing device according to aspects of the invention. The structural diagram of the system for detection of unwanted software comprises a storage of files and applications 101, a storage of the user activity history 102, a collecting module 111, a search module 112 and a scanning module 113.

The storage of files and applications 101 may be configured to:
  store the applications which have been installed on the user's computer;
  store the files associated with the applications which have been installed on the user's computer; and
  present the applications and files to the collecting module 111.

The storage of the user activity history 102 may be configured to:
  track, with the help of drivers (such as a computer mouse, a keyboard, and so on), the actions of the user on the applications which have been installed in the computer system;
  store information on the tracked actions of the user; and
  present the stored information to the scanning module 113.

For example, the user who is working with a graphic interface of a plug-in of the browser "AdBlock" may install certain parameters of the plug-in, for which he enters text data and manipulates elements of the interface (pressing buttons, moving sliders, and so on). The storage of the user activity history 102 tracks, with the help of the drivers of the computer mouse and keyboard, the actions of the user on the "Adblock" plugin as described above, and saves the information on the tracked actions (the time of pressing a button, the text entered, the time of working in the graphic interface, the identifiers of control elements which were manipulated by the user, and so forth).

The collecting module 111 may be configured to:
obtain from the storage of files and applications 101 the applications which have been installed in the computer system;
detect at least one file associated with the obtained application;
gather information on the relations of the detected file with at least one other file residing in the same computer system as the detected file, the two files being related if at least two of the following conditions are fulfilled:
the files were created by the same application,
the files were downloaded onto the user's computer from the same network address;
the interval of time between modifications of files is less than a selected threshold value;
the files have an identical file type (for example, file types can be executable files .exe, libraries .dll, archives .zip, video .avi and so forth);
one file may contain data for which the coefficient of similarity with data contained in a second file is greater than a selected threshold value;
the file attributes of different files match one another;
the paths to the location of the files may fall within the range of values of the registry keys situated in the same registry branch;
the interval of time between modifications of entries in the registry containing information about the files is less than an established threshold value.
and send the gathered information to the search module 112.
The files associated with an application may be detected:
by an analysis of the entries in the Windows registry indicating the paths to the location of files related to the application;
as a result of searching for files located on the same paths as the files responsible for the launching of the application.
The threshold value for the interval of time between modifications of the files may comprise at least:
under 1 second;
from 1 second to 1 minute; or
from 1 minute to 10 minutes.
The time interval between the installation in the computer system of the file associated with the application being scanned and the file related to it is less than an established threshold value, where the established threshold value is at least:
under 1 second;
from 1 second to 1 minute; or
from 1 minute to 10 minutes.
For example, files "illustrator.exe" and "Bridge.exe" may be associated with various applications—"Adobe Illustrator CS6" and "Adobe Bridge CS6", both of which may belong to graphics package "Adobe Creative Suite". The files "illustrator.exe" and "Bridge.exe" may be created at practically the same time: 10.11.2015 14:32:15.171 and 10.11.2015 14:32:16.025, respectively, i.e., with a difference of less than 1 second, which means with a high degree of probability that the applications "Adobe Illustrator CS6" and "Adobe Bridge CS6" were installed at the same time. Thus, the files "illustrator.exe" and "Bridge.exe" may be determined to be related to each other.
The application creating the files on the computer may be an installer program.
For example, the files "word.exe" and "excel.exe", which may be part of the applications "Microsoft Word 2013" and "Microsoft Excel 2013", respectively, were created in the computer system as a result of the working of the installation package "Microsoft Office 2013" (an installation program which began running with the launching of the file "office2013.msi"). Thus, the files "word.exe" and "excel.exe" may be determined to be related, at least because they were created in the computer system by the same application (the installation package "Microsoft Office 2013").
Another example may be illustrated by files "flash21.0.0.197.dll", which is the driver of the application "Adobe Flash", and "mcafee.exe", which is one of the files of the antivirus package "McAfee AntiVirus Plus." Both files may be created in a computer system as a result of the working of a browser, with the use of ActiveX when visiting the site "adobe.com", the installation package having been formed dynamically on the visited site in dependence on the options set by the user or specified by default. Thus, the files "flash21.0.0.197.dll" and "mcafee.exe" may be determined to be related, at least because those files were downloaded to the computer system from the same network address.
The data contained in the files may be the resources of the files (such as a description of the structure of the graphic interface elements, including dialog windows, media data, including images, video and audio recordings, and so forth).
For example, JPEG and PNG images stored in file resources may be considered to be similar if they have a similar color content. More specifically, each pixel in an image may store color in RGB format, the color is then converted into a YUV representation. All the stored images may be compared with one another for each channel Y, U and V of the images, such that a histogram of the distribution of the colors among all the pixel may be determined and formed. For each image, three 256-dimensional vectors may be obtained to determine a numerical value of a scalar product thereof. Such scalar product may indicate or characterize the degree of similarity of the images—the closer to 0, the more similar the images are.
Audio recordings stored in file resources may be considered to be similar if they possess similar sound data. For example, each block of an audio recording (an audio recording may include a set of sound blocks) stores information relating to the characteristics of sound (such as the frequency and duration) at a given moment of a sound composition, the set of selected characteristics (such as frequency) of all blocks of the audio recording may have a N-dimensional vector. A numerical value of a scalar product of two such vectors may be constructed for two audio recordings to indicate or characterize the degree of similarity of the audio recordings—the closer to 0, the more similar the audio recordings are.
For video recordings stored in the file resources, the similarity may be determined in a similar fashion to the above-described examples for images and audio recordings, as a video recording may similarly include a set of frames and soundtracks.
The similarity between dialog windows may be determined by the similarity of data associated with various graphic elements of the dialog windows. For example, information relating to at least two dialog windows may represent a set of characteristics of graphic elements of the dialog windows, which may be represented as a N-dimensional vector, where each metric is related to one of the characteristics of the graphic elements of the dialog windows. A numerical value of a scalar product of two such vectors may be determined and constructed for two dialog windows to indicate or characterize the degree of similarity of the at least two dialog windows—the closer to 0, the more similar the dialog windows.

For example, all the files of the application "Microsoft Word" may be related to the files of the application "Microsoft Excel":
- by the digital signature (one of the resources of the executable files making up "Microsoft Word" and "Microsoft Excel");
- by the manufacturer of the software (Microsoft); or
- by the common path of the installation in the file system ("C:\Programs File\Microsoft Office 2013").

The search module 112 may be configured to:
- detect at least one application containing at least one file found by the collecting module 111, the mentioned application having been installed in the same computer system as the application obtained by the collecting module 111; and
- send the information identifying the detected application to the scanning module 113;

The information identifying the detected application may contain at least:
- an identifier of each application (for example, the name of each application, stored in the registry branch containing information on the applications installed in the computer system);
- the paths to the files associated with each application; or
- the rules for launching each application in the computer system (for example, the start line, containing a path to the executable file and the launch keys).

The scanning module 113 may be configured to:
- determine the frequency of use of the application obtained by the collecting module 111 and the application identified from the information obtained by the search module 112, the frequency of use of the application indicating the number of actions performed by the application in the computer system; and
- detect the application obtained by the collecting module 111 as being an unwanted application based on a comparison of the frequencies of use of the application obtained by the collecting module 111 and the application identified from the information obtained by the search module 112.

The frequency of use of applications may be:
- the frequency of running the application from the moment of its installation in the computer system until the moment of performing the antivirus scan of the application;
- the frequency of calling of application-programming interface (API) functions of the operating system by the application during its running on the computer system;
- the frequency of modification of files associated with the application from the moment of their creation in the computer system until the moment of performing the antivirus scan of the application; or
- the frequency of actions carried out with use of interface elements of the application for transmittal of data to the application.

The comparison of the frequencies of use of the application obtained by the collecting module 111 and the application identified by the information obtained by the search module 112 may be performed as follows:
- the frequency of use of each application, comprising one or more of the frequencies described above, is represented in the form of a multidimensional vector, the component of which represents one of the frequencies constituting the frequencies of use of the application, for example:

$$\theta = \{\theta_1, \theta_2, \ldots, \theta_n\},$$

where
- $\theta$—frequency of use of the application,
- $\theta_1$—frequency of launching the application from the moment of its installation in the computer system until the moment of performing the antivirus scan of the application,
- $\theta_2$—frequency of calling of API functions of the operating system by the application during its running on the computer system,
- $\theta_3$—frequency of modification of files associated with the application from the moment of their creation in the computer system until the moment of performing the antivirus scan of the application,
- $\theta_4$—frequency of actions carried out with use of interface elements of the application for transmittal of data to the application.

a scalar product of two vectors may be calculated, where each vector is a representation of the frequency of use of the application, constructed by the method described in the preceding point;

$$\omega \times \langle \theta, \vartheta \rangle = \theta_1 \times \vartheta_1 + \theta_2 \times \vartheta_2 + \ldots + \theta_n \times \vartheta_2,$$

where
- $\theta$—frequency of use of application #1,
- $\vartheta$—frequency of use of application #2, the calculated value is compared with a selected threshold value and in the event that the calculated value is greater than the established threshold value, the application obtained by the collecting module 111 may be determined as being unwanted.

For example, the frequency of use of the applications "Microsoft Word" and "AdBlock Plus", installed with the aid of the custom assembly installation package, may be a group of several characteristics at the same time, namely:

for Microsoft Word:
- the frequency of running the application (such as once a day); or
- the frequency of actions performed with the use of interface elements of the application for the transmittal of data to the application (such as once a second, in the event that the user is typing text).

for AdBlock Plus:
- the frequency of running the application (such as 10 times a day);
- the frequency of actions performed with the use of interface elements of the application for the transmittal of data to the application (such as 0.0000034 times a second, in the event that the user is changing the application settings).

The result of the comparison of the obtained frequencies of use of Microsoft Word and AdBlock Plus may be a numerical value represented by a scalar product of vectors, namely:

$$\omega \times \langle \theta, \vartheta \rangle = \theta_1 \times \vartheta_1 + \theta_2 \times \vartheta_2,$$

where
- $\omega$—a result of comparison of the frequencies of use of Microsoft Word $\theta$ and AdBlock Plus $\vartheta$,
- $\theta_1$—frequency of running the Microsoft Word application,
- $\vartheta_1$—frequency of running the AdBlock Plus application,
- $\theta_2$—frequency of actions performed with the use of interface elements of the Microsoft Word application, $\vartheta_2$—frequency of actions performed with the use of interface elements of the AdBlock Plus application.

The frequency of use of the application may indicate not only how actively the application is being used, but also how often the user "consciously" uses the application. For example, if an application installed in a computer system has a graphic interface, but the user does not make use of it (i.e., does not work with the elements of the graphic interface by means of keyboard, mouse, or another manipulator), then it may be affirmed with a high degree of probability that such an application is unwanted. In the event that such an application has been installed from an installation package with other applications, it may be affirmed that the mentioned application is unwanted. Thus, the same application on different computers and for different users may be determined as both legitimate and unwanted.

The following illustrates an example system for detecting unwanted software on a user's computer or computing device according to one aspect of the invention.

In a computer system a search for unwanted applications may be commenced based at least on an established security policy of regular performance of an antivirus scan of the computer system. The collecting module 111, based at least on data provided by the storage of files and applications 101 (specifically, data entered in registry branches containing information on the applications installed in the computer system), may detect the application "Yandex Toolbar", which is a plug-in for browsers. In the browser settings entered in the registry, an entry pertaining to "Yandex Toolbar" may be located and indicating a path to a file associated with the application "Yandex Toolbar" and performing the functionality of a plug-in for the browser "Google Chrome" ("C:\Program Files\Google\Chrome\Plugins\ytbar.exe").

Further, the search module 112 may gather information for the located file "ytbar.exe" based on the relations of this file with other files associated with the computer system. For this purpose, the following actions may be performed:
- a search may be made for files with a time of creation different from the time of creation of "ytbar.exe" by not more than one minute; or
- a search was made for files located in the same directory as "ytbar.exe" (or in a directory of similar title, such as " . . . \Chrome\Plugins\ytbar.exe"and" . . . \Firefox\Plugins\ytbar2.exe").

As a result, another several dozen files may be detected which appeared in the computer system at the same time as the file "ytbar.exe" being investigated, or by similar paths. A determination may be made with respect to which applications are associated with the detected files "Yandex Toolbar" and "K-Lite Codecs".

After determining that the applications are related to each other through the files included in their makeup, the scanning module 103 may further determine the frequency of use of the detected applications.

For example, results may be obtained as follows:
1 "K-Lite Codecs", being a group of codecs and utilities for working with video and audio files (mainly coding and decoding).
It may be determined that:
  the files of the application "K-Lite Codecs" which are .dll libraries were run 30 times a day;
  the files of the application "K-Lite Codecs" which may comprise executable .exe files of utilities for working with video and audio files were run twice a day;
  one of the files of the application "K-Lite Codecs", a utility ("GraphStudioNext64.exe"), may have a graphic interface containing control elements, and the user interacted with the control elements (pressing buttons, entering parameters) 15 times for every running of the file "GraphStudioNext64.exe".

From the data obtained, it may be determined that the application "K-Lite Codecs" is actively working and being used regularly by the user. #2 "Yandex Toolbar", being a plug-in for browsers, having a graphic interface and providing the user with rapid access to various services, such as weather reports, email services, and so on.

It may be determined that:
  the files of the application "Yandex Toolbar" were being run 25 times a day (corresponding to the number of times the browser was run);
  in the graphic interface of the application "Yandex Toolbar" not once were any actions performed with the use of the interface elements of the application for transmittal of data to the application.

From the data obtained, it may be determined that the application "Yandex Toolbar":
  was installed together with the application "K-Lite Codecs" from the same installation package (K-Lite Codec Pack Mega); and
  having been installed, it is not being used by the user.

Thus, it may be determined that the application "Yandex Toolbar" is unwanted and should be removed from the computer system.

Figure 2:
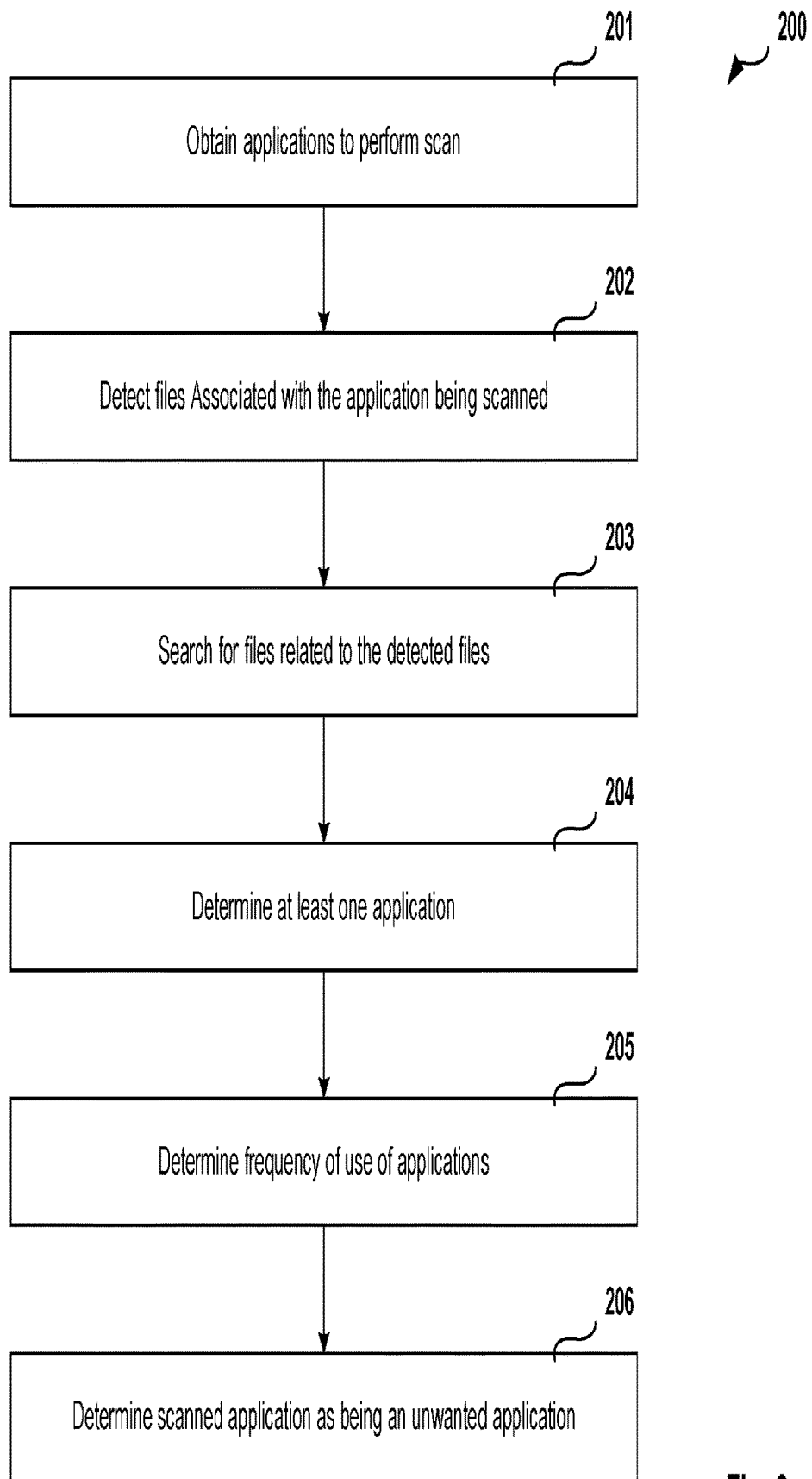
FIG. 2 illustrates a structural diagram of an example method for detecting unwanted software on a computing device according to aspects of the invention.

FIG. 2 presents an example flow chart of a method 200 of detecting unwanted software on a user's computer or computing device according to aspects of the invention.

The method 200 of detecting unwanted software may include a step 201 carried out by the collecting module 111, in which applications are obtained for performance of a scan, a step 202 carried out by the collecting module 111 in which files associated with at least one application being scanned may be detected, a step 203 carried out by the search module 112 in which a search may be performed for files related to the detected files, a step 204 carried out by the search module 112 in which applications are determined, a step 205 carried out by the scanning module 113 in which the frequency of use of the applications is determined, and a step 206 carried out by the scanning module 113 in which the application being scanned may be determined to be an unwanted application.

In step 201, applications that are installed in the computer system may be obtained from the storage of files and applications 101.

In step 202, files associated with at least one application being scanned may be detected.

The files associated with the application may be detected:
  by an analysis of the entries in the Windows registry indicating paths to the locations of the files related to at least one of the applications;
  as a result of searching for files located on the same paths as the files responsible for the launching of the at least one application.

In step 203, a search may be performed in the computer system in which the files detected in step 202 may be located for files related to the aforementioned files, two files being related if at least two of the following conditions are fulfilled:
  the files were created by the same application,
  the files were downloaded onto the computer from the same network address;
  the interval of time between modifications of files may be less than an established threshold value;

the files may have an identical file type (for example, file types can be executable files .exe, libraries .dll, archives .zip, video .avi and so forth);

one file may contain data for which the coefficient of similarity with data contained in a second file is greater than a selected threshold value;

the file attributes are similar or identical for both files;

the paths to the location of the files may fall within the range of values of the registry keys situated in the same registry branch; and the interval of time between modifications of entries in the registry containing information on the files may be less than an established threshold value.

The threshold value for the interval of time between modifications of the files may be at least:

under 1 second;

from 1 second to 1 minute; or from 1 minute to 10 minutes.

The time interval between the installation in the computer system of the file making up the application being scanned and the file related to it may be less than a selected threshold value, where the selected threshold value may be at least:

under 1 second;

from 1 second to 1 minute; or from 1 minute to 10 minutes.

The application creating the files on the computer may be an installation program (installer).

The data contained in the files may be the resources of the files (such as a description of the structure of graphic interface elements, including dialog windows, media data, including images, video and audio recordings, and so forth).

In step 204, at least one application may be detected containing at least one file located and determined during step 203, the application having been installed in the same computer system as the application found during step 201.

The information on the detected application may contain at least:

an identifier of each application (for example, the name of each application, stored in the registry branch containing information on the applications installed in the computer system);

the paths to the files associated with each application; or the rules for launching each application in the computer system (for example, the start line, containing a path to the executable file and the launch keys).

In step 205, a frequency of use may be determined for at least one application obtained during step 201 and the application detected during step 204, the frequency of use of the application indicating the number of previously established actions performed by the application in the computer system during a selected period of time.

The frequency of use of applications may be:

the frequency of running the application from the moment of its installation in the computer system until the moment of performing the antivirus scan of the application;

the frequency of calling of API functions of the operating system by the application during its running on the computer system;

the frequency of modification of files associated with the application from the moment of their creation in the computer system until the moment of performing the antivirus scan of the application; or the frequency of actions carried out with use of interface elements of the application for transmittal of data to the application.

In step 206, the application obtained during step 201 is discovered to be an unwanted application based at least on a comparison of the frequencies of use obtained in step 205 for the application obtained in step 201 and the application detected in step 204.

The comparison of the frequencies of use of the application obtained in step 201 and the application detected in step 204 may be performed as follows:

the frequency of use of each application obtained in step 205 and comprising one or more of the frequencies described above, may be represented in the form of a multidimensional vector, the component of which may represent one of the frequencies comprising the frequencies of use of the application, for example:

$$\theta = \{\theta_1, \theta_2, \ldots, \theta_n\},$$

where $\theta$—frequency of use of the application, $\theta_1$—frequency of launching the application from the moment of its installation in the computer system until the moment of performing the antivirus scan of the application, $\theta_2$—frequency of calling of API functions of the operating system by the application during its running on the computer system, $\theta_3$—frequency of modification of files associated with the application from the moment of their creation in the computer system until the moment of performing the antivirus scan of the application, $\theta_4$—frequency of actions carried out with use of interface elements of the application for transmittal of data to the application.

a scalar product of two vectors may be calculated, where each vector may be a representation of the frequency of use of the application, constructed by the method described in the preceding point;

$$\omega \times \langle \theta, \vartheta \rangle = \theta_1 \times \vartheta_1 + \theta_2 \times \vartheta_2 + \ldots + \theta_n \times \vartheta_2,$$

where $\theta$—frequency of use of application #1, $\vartheta$—frequency of use of application #2, the calculated value may be compared with a selected threshold value and in the event that the calculated value is greater than the selected threshold value, the application obtained in step 201 may be determined as being unwanted.

Figure 3:
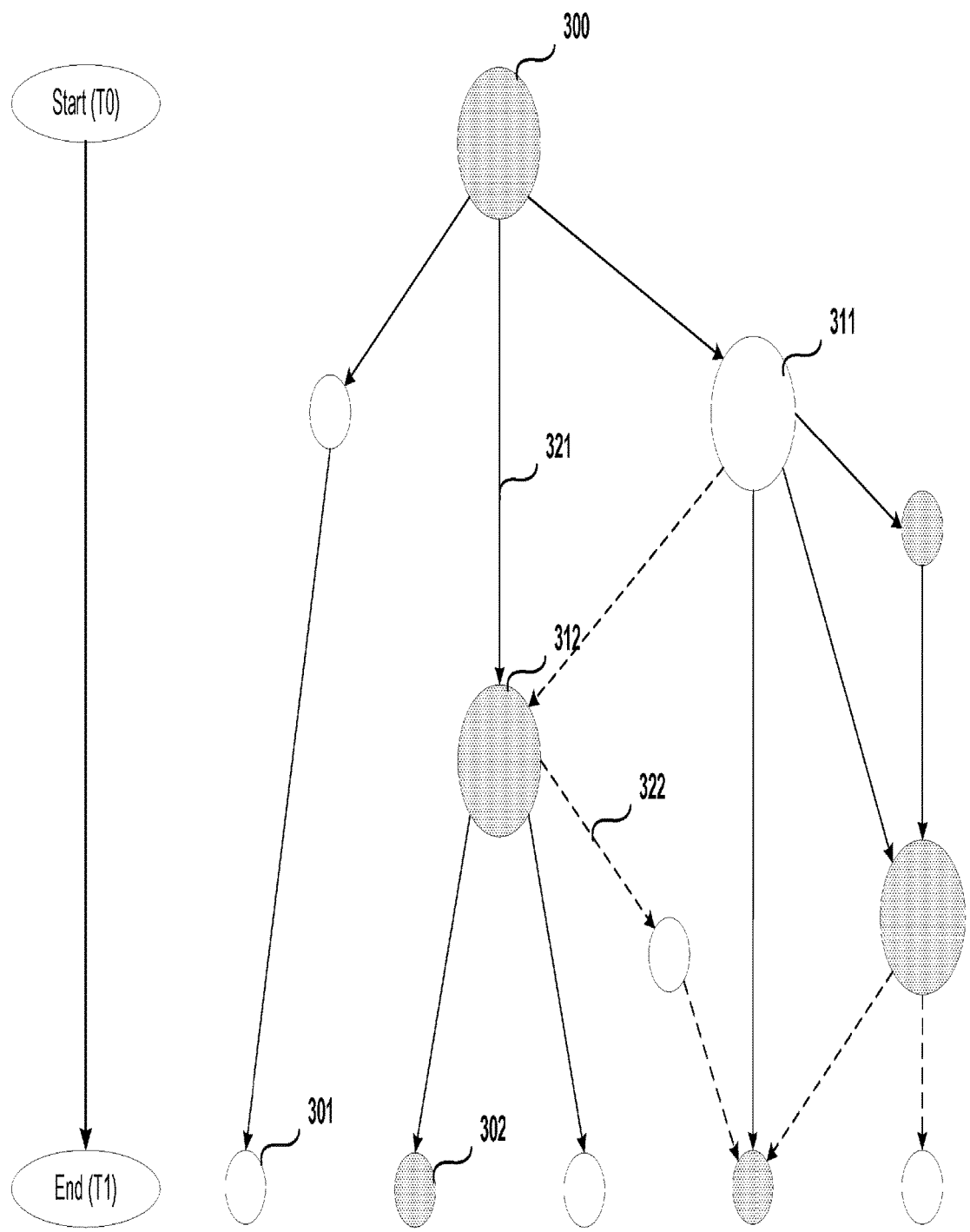
FIG. 3 illustrates a structural diagram of the recreating of the installed package based on the installed files and applications on a computing device according to aspects of the invention.

FIG. 3 illustrates a structural diagram for the recreation of the installation package from the files and applications installed on a user's computer or computing device according to aspects of the invention.

The structural diagram for the recreation of the installation package from the files created in the computer system and the applications installed in the computer system may contain an installation package 300 designed to install legitimate and unwanted applications in the computer system, legitimate files 301, unwanted files 302, legitimate applications 311, unwanted applications 312, the applications and files being related to each other by direct relations 321 and indirect relations 322.

Two applications may be related by a direct relation in the event that the makeup of one application includes files created during the running of the second application.

In accordance with aspects of the invention, an application and a file may be related by a direct relation in the event that the file was created during the running of the application.

Two files may be related by a direct relation in the event that one file has been created during the running of an application whose makeup includes the second file.

Two applications may be related by an indirect relation in the event that both applications use common data in their running. For example, the application Microsoft Word and Microsoft Excel are different applications, but during operation they use the same parameters (such as the path for saving of documents by default, spellcheck settings, and so on), entered in the registry.

Two files may be related by an indirect relation in the event that the applications whose makeup includes the files may be related by an indirect relation.

An application and a file may be related by an indirect relation in the event that the application may be related by an indirect relation to another application whose makeup includes the file.

Since the instant of installation of an unwanted application 312 from the installation package 300 a substantial time may pass, after which a search may be performed for unwanted applications (for example, using an antivirus). Since the unwanted applications 312 may be practically no different than legitimate applications 311, their detection and identification may present great difficulty to antivirus applications. Even so, the installation package itself 300 from which the unwanted applications 312 have been installed may, when detected, be identified as unwanted based at least on its behavior (using heuristic analysis) or an analysis of its structure (using signature analysis). However, after performing its work of installing the applications in the computer system, the installation package 300 is often removed (automatically or by the user), so that its analysis may become impossible. According to aspects of the invention, by carrying out an analysis of the existing applications installed in the computer system, containing files related to each other by direct relations 321, one may recreate the installation package 300 or its behavior in the installation of applications through recreating the indirect relations 322. On the basis of an analysis of the direct 321 and indirect 322 relations among the files 301, 302 created in the computer system and the applications 311, 312 installed and running in the computer system, one may select files and applications comprising the installation package 300 identical in behavior or content to the installation package which was used to create the files 301, 302 in the computer system. On the basis of the results of signature or heuristic analysis of the obtained installation package 300, it may enable revealing unwanted applications installed by means of the installation package 300 in the computer system.

Referring to FIG. 3, for example, in step 1, all related files may be detected (including both legitimate ones 301 and unwanted ones 302, although their status may not yet be known at the moment of discovery), two files being related if certain of the following conditions are fulfilled:
the files were created by the same application,
the files were downloaded onto the computer from the same network address;
the interval of time between modifications of files is less than a selected threshold value;
the file attributes are similar or identical for both files;
the paths to the location of the files fall within the range of values of the registry keys situated in the same registry branch;
the interval of time between modifications of entries in the registry containing information on the files is less than a selected threshold value.

The files associated with an application may be detected:
by an analysis of the entries in the Windows registry indicating the paths to the location of files related to the application; or
as a result of searching for files located on the same paths as the files responsible for the launching of the application.

The interval of time between the installation in the computer system of a file associated with the application being scanned and a file related to it is less than a selected threshold value.

The application creating the files on the computer may be an installation program (installer).

In step 2, dependencies may be identified between the detected files and applications whose makeup includes the files (indirect relations 322), as well as files associated with applications which took part in creating the files (direct relations 321).

For example, in step 1 the files "data.dat" and "data.ini" may be detected, created at the same time, while in step 2 the file "app.zip" may be located, being an archive saving the archived files "data.dat" and "data.ini". The archive located may also contain the file "app.exe", which may be absent from the computer system at the time of performance of step 1. This file may be considered to be related by an indirect relation 322 to the files "data.dat" and "data.ini".

Step 2 may continue by iterations until one may discover, for all the files discovered in step 1, the applications and files related to the mentioned files discovered in step 1. Files created in the computer system earlier than the other files discovered in step 1 and step 2, as well as applications installed in the computer system earlier than the other applications discovered in step 2, will be related to the installation package 300.

In step 3, an antivirus scan may be performed for the identified installation package 300. As was mentioned above, the discovery of unwanted applications by the tools of an antivirus application may cause difficulties, as unwanted applications may be practically indistinguishable from legitimate applications—they may not carry out malicious activity in the computer system. Even so, when unwanted applications are installed in a computer system, certain actions need to be performed (for example, so that the user does not cancel the installation itself or the conditions of the installation), which can already be detected by antivirus applications. If the installation package 300 as a result of the antivirus scan may be recognized as being capable of installing unwanted applications, an analysis may be performed on all applications installed by it and all files created by it, down to the files which were discovered during step 1 in order to identify unwanted applications 312. More specifically, the frequency of use of the discovered applications and files may be determined, the frequency of use of an application indicating the number of previously established actions performed by the application in the computer system in an established time, and where the frequency may be:
the frequency of running the application from the moment of its installation in the computer system until the moment of performing the antivirus scan of the application;
the frequency of calling of API functions of the operating system by the application during its running on the computer system;
the frequency of modification of files associated with the application from the moment of their creation in the computer system until the moment of performing the antivirus scan of the application;

the frequency of actions carried out with use of interface elements of the application for transmittal of data to the application.

Applications whose frequency of use so determined is less than a selected threshold value may be determined as being unwanted.

For example, two applications have been installed in a computer system via the installation package "Adobe Flash Installer": a plug-in for browsers "Adobe Flash Player" and the antivirus "McAfee AntiVirus Plus". The frequency of use of the plug-in "Adobe Flash Player" amounted to ~100 call-ups a day, whereas the frequency of use of the antivirus "McAfee AntiVirus Plus" was 0.01 call-ups per day. Upon comparing the frequencies of use with a selected threshold value equal to 0.25, the antivirus "McAfee AntiVirus Plus" may be determined as being unwanted. So low a frequency of use of the antivirus "McAfee AntiVirus Plus" may indicate that the user is not using the installed antivirus "McAfee AntiVirus Plus".

Figure 4:
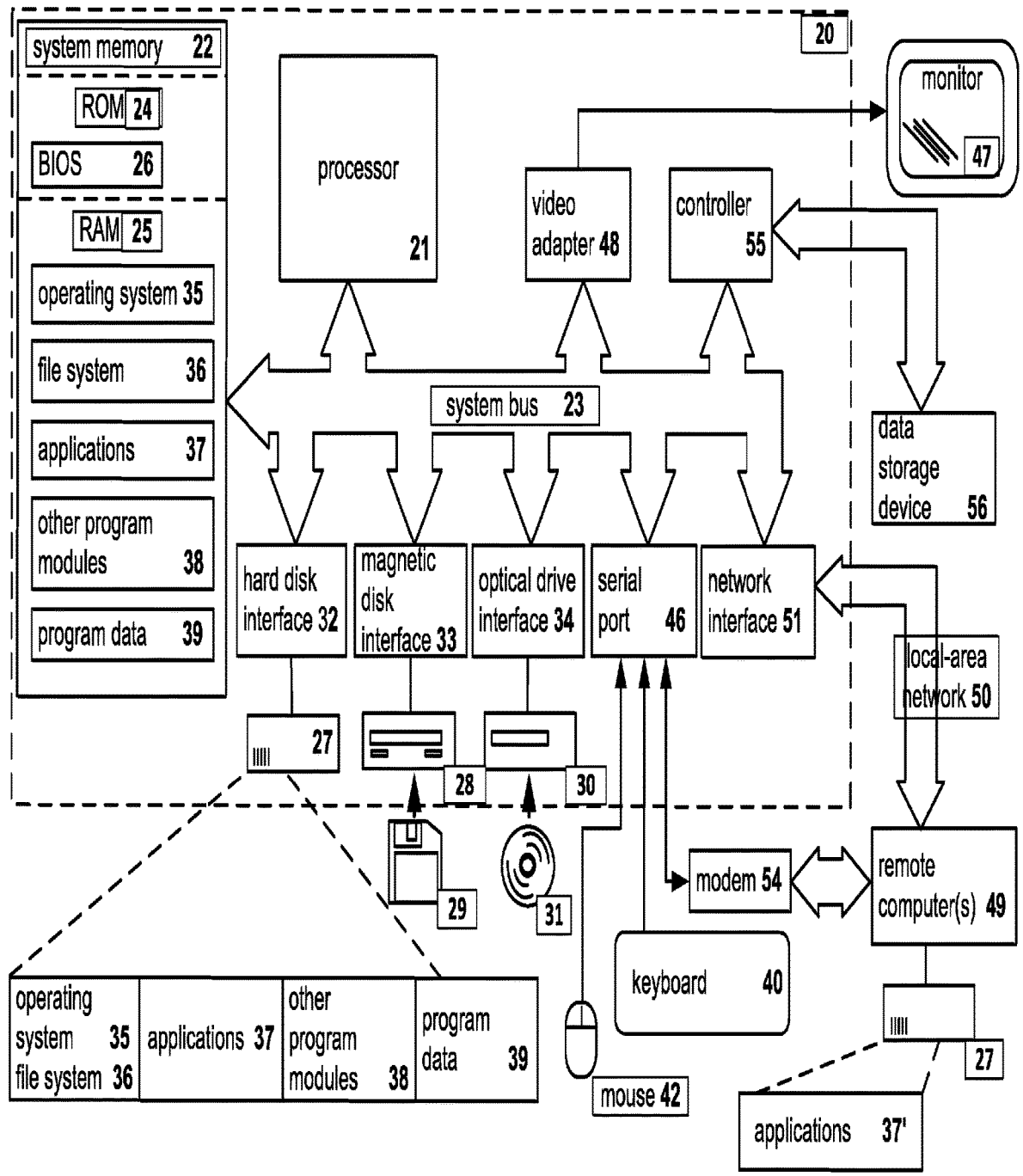
FIG. 4 illustrates an example of a computer system, a personal computer, or a server by means of which the disclosed aspects of systems and method may be implemented.

FIG. 4 illustrates an example of a computer system or computing device on which the disclosed systems and method may be implemented. As shown, the computer system includes a central processing unit 21, a system memory 22 and a system bus 23 connecting the various system components, including the memory associated with the central processing unit 21. The system bus 23 is realized like any bus structure known from the prior art, containing in turn a bus memory or bus memory controller, a peripheral bus and a local bus, which is able to interact with any other bus architecture. The system memory includes permanent memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate in a network environment, using a network connection to one or more remote computers 49. The remote computer (or computers) 49 are also personal computers or servers having the majority or all of the aforementioned elements in describing the nature of a personal computer 20. Other devices can also be present in the computer network, such as routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a user computer or computing device (such as collecting module 111, search module 112 and scanning module 113 described in greater detail in FIGS. 1-3 above). Accordingly, each module can be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method of detecting one or more unwanted applications installed on a computing device, the method comprising:
   identifying a first file associated with a first application and a second file installed on the computing device, wherein the first file is related to the second file;
   identifying a second application installed on the computing device that uses at least one of the first and second files;
   determining a first frequency of use for the first application and a second frequency of use for the second application;
   determining that the second application was installed at substantially the same time as the first application based on a comparison of the first frequency of use and the second frequency of use; and
   determining that the first application is an unwanted application when the comparison of the first frequency of use and the second frequency of use results in a degree of similarity greater than a threshold value.

2. The method of claim 1, further comprising:
   identifying one or more dialog windows associated with a first application and one or more dialog windows associated with a second application, both applications installed on the computing device;
   forming a first feature vector of graphic elements of a first dialog window of the one or more dialog windows of the first application and a second feature vector of graphic elements of a second dialog window of the one or more dialog windows of the second application;
   determining there is a similarity between the first application and the second application based on similarity between the first feature vector and the second feature vector; and
   in response to determining the similarity, determining that the first application is an unwanted application.

3. The method of claim 2, further comprising:
   calculating a scalar product of the first feature vector and the second feature vector; and
   determining that the first application is unwanted when the scalar product is less than a predetermined threshold value.

4. The method of claim 1, further comprising:
   determining that the first file and the second file contain audio data;
   determining that the audio data in each of the first file and the second file are similar; and
   identifying that the first file and the second file are related.

5. The method of claim 4, wherein determination of the similarity of the audio data in the first and the second files further comprises:
   generating a first feature vector of the audio data in the first file and a second feature vector of the audio data in the second file from characteristics of the audio data in each file; and
   determining that the first file and the second file are related by comparing the first feature vector and the second feature vector.

6. The method of claim 5, wherein the comparing of the first feature vector and the second feature vector comprises:
   calculating a scalar product of the first feature vector and the second feature vector; and
   determining that the files are related when the scalar product is less than a predetermined threshold value.

7. The method of claim 1, wherein the identifying of the first file associated with the first application comprises:
   analyzing entries in a Windows registry indicating paths to locations of files related to the first application; and
   identifying the first file which is located on a same path as at least one file responsible for a launching of the first application.

8. The method of claim 1, wherein the identifying of the second application installed on the computing device that uses at least one of the first and second files is based upon at least one of:
   information stored in a registry branch for identifying applications installed on the computing device;
   paths to the first and second files associated with each corresponding application; and
   rules for launching each application installed on the computing device.

9. The method of claim 1, wherein the usage, by the second application, of the at least one of the first and second files comprises:
   the first and second files being created by a same application;
   the first and second files being loaded onto the computing device from a same network address;
   an interval of time between modifications of the first and second files being less than a selected threshold value; and
   the first and second files having identical or similar attributes or data.

10. The method of claim 4, wherein the selected threshold value comprises at least one of:
    under 1 second;
    from 1 second to 1 minute; or
    from 1 minute to 10 minutes.

11. The method of claim 1 wherein frequency of use comprises one or more of:

a frequency of use of the application, a frequency of launching the application until performing a virus scan of the application, a frequency of calling of Application Programming Interface (API) functions of an operating system by the application, a frequency of modification of files until the virus scan, and a frequency of actions carried out using interface elements of the application.

12. A system for detecting one or more unwanted applications installed on a computing device, the system comprising:
a hardware processor configured to:
identify a first file associated with a first application and a second file installed on the computing device, wherein the first file is related to the second file;
identify a second application installed on the computing device that uses at least one of the first and second files;
determine a first frequency of use for the first application and a second frequency of use for the second application;
determine that the second application was installed at substantially the same time as the first application based on a comparison of the first frequency of use and the second frequency of use; and
determine that the first application is an unwanted application when the comparison of the first frequency of use and the second frequency of use results in a degree of similarity greater than a threshold value.

13. The system of claim 12, wherein the hardware processor is further configured to:
identify one or more dialog windows associated with a first application and one or more dialog windows associated with a second application, both applications installed on the computing device;
form a first feature vector of graphic elements of a first dialog window of the one or more dialog windows of the first application and a second feature vector of graphic elements of a second dialog window of the one or more dialog windows of the second application;
determine there is a similarity between the first application and the second application based on similarity between the first feature vector and the second feature vector; and
in response to determining the similarity, determine that the first application is an unwanted application.

14. The method of claim 13, wherein the hardware processor is further configured to:
calculate a scalar product of the first feature vector and the second feature vector;
determine that the first application is unwanted when the scalar product is less than a predetermined threshold amount.

15. The system of claim 12, wherein the hardware processor is further configured to:
determine that the first file and the second file contain audio data;
determine that the audio data in each of the first file and the second file are similar; and
identify that the first file and the second file are related.

16. The system of claim 15, wherein the configuration for the determination of the similarity of the audio data in the first and the second files further comprises a configuration for:
generating a first feature vector of the audio data in the first file and a second feature vector of the audio data in the second file from characteristics of the audio data in each file; and
determining that the first file and the second file are related by comparing the first feature vector and the second feature vector.

17. The system of claim 16, wherein the configuration for comparing of the first feature vector and the second feature vector further comprises a configuration for:
calculating a scalar product of the first feature vector and the second feature vector; and
determining that the files are related when the scalar product is less than a predetermined threshold value.

18. The system of claim 12, wherein the configuration for identification of the first file associated with the first application comprises a configuration for:
analyzing entries in a Windows registry indicating paths to locations of files related to the first application; and
identifying the first file which is located on a same path as at least one file responsible for a launching of the first application.

19. The system of claim 12, wherein the identification of the second application installed on the computing device that uses at least one of the first and second files is based upon at least one of:
information stored in a registry branch for identifying applications installed on the computing device;
paths to the first and second files associated with each corresponding application; and
rules for launching each application installed on the computing device.

20. The system of claim 12, wherein the usage, by the second application, of the at least one of the first and second files comprises:
the first and second files being created by a same application;
the first and second files being loaded onto the computing device from a same network address;
an interval of time between modifications of the first and second files being less than a selected threshold value; and
the first and second files having identical or similar attributes or data.

* * * * *